United States Patent
Dasgupta et al.

(10) Patent No.: US 7,352,823 B2
(45) Date of Patent: Apr. 1, 2008

(54) ALGORITHM FOR COMPUTING DISTANCES TO A RECEIVED POINT IN AN ADSL SYSTEM

(75) Inventors: Udayan Dasgupta, Irving, TX (US); Fernando A. Mujica, Allen, TX (US); Murtaza Ali, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 787 days.

(21) Appl. No.: 10/748,998

(22) Filed: Dec. 30, 2003

(65) Prior Publication Data

US 2004/0267852 A1 Dec. 30, 2004

Related U.S. Application Data

(60) Provisional application No. 60/482,912, filed on Jun. 26, 2003.

(51) Int. Cl.
*H04L 5/12* (2006.01)
*H04L 23/02* (2006.01)

(52) U.S. Cl. ............... 375/261; 375/265; 375/341; 714/792; 714/794; 714/795

(58) Field of Classification Search ........... 375/265, 375/261, 341; 714/792, 794, 795
See application file for complete search history.

(56) References Cited

U.S. PATENT DOCUMENTS 6,594,319 B1 * 7/2003 Shaikh ................ 375/265
7,224,743 B2 * 5/2007 Holmes et al. ........ 375/265

OTHER PUBLICATIONS

"International Telecommunication Union—ITU-T G.992.1—Series G: Transmission Systems and Media, Digital Systems and Networks, Digital Transmission Systems—Digital Sections and Digital Line System—Access Networks—Asymmetric Digital Subscriber Line (ADSL) Transceivers," International Telecommunication Union, Jun. 1999, Geneva, Switzerland.

* cited by examiner

*Primary Examiner*—Phuong Phu
(74) *Attorney, Agent, or Firm*—Steven A. Shaw; W. James Brady; Frederick J. Telecky, Jr.

(57) ABSTRACT

Method for computing distances to received data points. A preferred embodiment comprises determining a first point on a grid nearest to the received point, computing a second point closest to the received point inside a specified area, wherein the second point is a point in a first coset, computing a third, fourth, and fifth point, wherein each point is a member of a different coset and each point is the closest point in its coset to the received point, and computing a distance from the received point to each of the second, third, fourth, and fifth points.

22 Claims, 7 Drawing Sheets

ALGORITHM FOR COMPUTING DISTANCES TO A RECEIVED POINT IN AN ADSL SYSTEM

CROSS-REFERENCE TO RELATED APPLICATIONS

This application claims the benefit of U.S. Provisional Application No. 60/482,912, filed Jun. 26, 2003, entitled "Efficient Algorithm to Account for Finite Constellation Boundaries in Decoders for ADSL Systems", which application is hereby incorporated herein by reference.

This application is related to the following co-pending and commonly assigned patent application: Ser. No. 10/740,251, filed Dec. 18, 2003, entitled "Trellis Decoding with Finite Constellation Boundaries," which application is hereby incorporated herein by reference.

TECHNICAL FIELD

The present invention relates generally to a method for digital communications, and more particularly to a method for computing distances to received data points.

BACKGROUND

In digital communications systems, data that is to be transmitted is often encoded to increase spectral efficiency or to improve resistance to interference or both. For example, in an asymmetric digital subscriber line (ADSL) digital communications system, for each tone being transmitted, a transmitter can choose a symbol from a set of $2^2$ to $2^{15}$ possible symbols, depending upon the number of bits (bits=2 to bits=15) carried in the tone. Furthermore, the ADSL technical standards can permit the use of a 4-D 16 state trellis code to improve system performance. The trellis code can be used to encode the two least significant bits of every constellation (tone) while the remaining bits are left uncoded. At a receiver, a Viterbi algorithm can be used to optimally decode the two least significant bits and then the decoded information can be provided to a slicer to permit processing of the higher bits in the tone.

An initial step in the Viterbi algorithm involves the computation of Euclidean distances between a received point (representing the tone) and the closest point in each of four 2-D constellation subsets (cosets). Additionally, to process the higher bits in the tone, the slicer also needs to find the closest valid constellation point that belongs to the coset predicted by the Viterbi algorithm.

A commonly used solution computes the Euclidean distance between the received point and each point in the constellation. This method ensures that the correct answer is found in each case. Furthermore, the computation of the Euclidean distance for each point in the constellation can make the finding of the closest valid constellation point a trivial matter. This solution ensures that the optimum answer is found.

A variant of the above solution involves the use of an "infinite grid" which overlays the constellation and is a superset of the constellation. The use of the infinite grid can simplify the computation of the Euclidean distances between the received point and the points in the constellation, since varying boundary conditions do not have to be considered.

One disadvantage of the prior art is that since the number of points in a constellation can vary from 4 (2 bits $\rightarrow 2^2$ constellation points) to 32768 (15 bits $\rightarrow 2^{15}$ constellation points), the computation of the Euclidean distances from the received point to each point in the constellation can consume a considerable amount of time. Furthermore, when the constellation size is large, it may not be possible for the computation of the Euclidean distances to complete within an amount of time allotted for the decoding of the received tone.

A second disadvantage of the prior art is that the amount of time to compute the Euclidean distances can vary with the number of constellation points. This can result in an unpredictable decoding time. The unpredictable decoding time can lead to undesirable performance.

A third disadvantage of the prior art is that the use of the infinite grid is not valid since the constellations are finite in size. The use of an infinite grid can lead to decoding errors, especially when the constellation sizes are small (a small number of bits per tone). The decoding errors can result in unacceptable system performance.

SUMMARY OF THE INVENTION

These and other problems are generally solved or circumvented, and technical advantages are generally achieved, by preferred embodiments of the present invention which provides for a method that can be used to locate closest cosets and closest constellation points for a variety of different constellations.

In accordance with a preferred embodiment of the present invention, a method for computing distances between a received point and four points in a two-dimensional grid with a constellation representing a number of bits greater than three, wherein the each of the four points belong to a unique coset in the constellation, the method comprising determining a first point on a grid nearest to the received point, computing a second point closest to the received point inside a specified area, computing a third, fourth, and fifth point, wherein each point is a member of a different coset and each point is the closest point in its coset to the received point, and computing a distance from the received point to each of the second, third, fourth, and fifth points is provided.

In accordance with another preferred embodiment of the present invention, a method for computing distances between a received point and four points in a two-dimensional grid with a constellation representing a number of bits equal to three, wherein the each of the four points belong to a unique coset in the constellation, the method comprising computing a point from each coset to the received point, and computing a distance from the received point to the point in each coset is provided.

An advantage of a preferred embodiment of the present invention is that the method may be used for a variety of different constellations and the amount of computation remains constant, independent of constellation size. Therefore, the amount of time needed to locate the closest cosets and constellation points is the same for a four point constellation as it is for a 32768 point constellation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a communications system that is adherent to the asymmetric digital subscriber line (ADSL) technical specifications. The ADSL technical specifications can be found in a document entitled "International Telecommunication Union—ITU-T G.992.1—Series G: Transmission Systems and Media, Digital Systems and Networks, Digital Transmission Systems—Digital Sections and Digital Line System—Access Networks—Asymmetric Digital Subscriber Line (ADSL) Transceivers," published Jun. 1999, which is herein incorporated by reference. The invention may also be applied, however, to other digital subscriber line systems, such as G.lite, ADSL2, and ADSL2+. Furthermore, the invention can have application in other systems where there may be a need to find points closest to a specified point, wherein the points are part of a regular structure.

Figure 1:
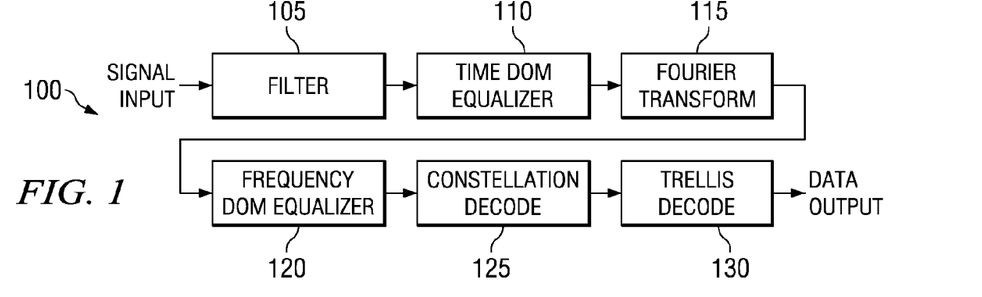
FIG. 1 is a diagram of a portion of a receiver.

With reference now to FIG. 1, there is shown a diagram illustrating a portion of a receiver 100 for use in an ADSL communications system. FIG. 1 displays a portion of the receiver responsible for receiving a signal that has been transmitted and then processing the received signal to convert the received signal back into data form that can be used by devices (100) coupled to the receiver 100. The received signal can be provided to the receiver 100 by a signal input, which may be an antenna or signal receiver (in the case of a wireless system) or a data port (in the case of a wired system). The received signal may then be filtered by a filter 105. The filtering can be used to help eliminate out-of-band interferers. It can also be used to band-limit the received signal. A time domain equalizer 110 can then be used to flatten the received signal by shortening the channel, for example.

Since in an ADSL system the transmitted signal (and hence, the received signal) is transmitted in its time domain representation but is manipulated in its frequency domain representation, a Fourier transform (via a Fourier transform unit 115) can be used to convert the received signal into a frequency domain signal. Typically, a fast Fourier transform (FFT) can be used to perform a rapid conversion, although other Fourier transform algorithms can be used. After conversion into a frequency domain signal, a frequency domain equalizer 120 can be used to gain and phase adjust the tones. Then, a constellation decoder 125 and a trellis decoder 130 can be used to convert tones carried in the received signal into data that can be used by devices coupled to the receiver 100.

According to the ADSL technical specifications, a plurality of tones can be used to carry data in the transmitted signal of an ADSL communications system. Each tone can carry a number of data bits varying from two (2) bits to fifteen (15) bits, with the number of bits per tone being dependent upon the quality of the communications channel in the frequency range to be occupied by the tone. For example, if the frequency range to be occupied by a tone is of questionable quality, then the tone may be allowed to only carry a small number of bits. The use of a small number of bits in a tone can help increase the probability of the bits being successfully transmitted.

A 2-D constellation diagram can be drawn for each tone based upon the number of bits carried in the tone. For example, a tone with two bits of data can be represented with a 2-D constellation diagram with four points, while a tone with seven bits of data can be represented with a 2-D constellation diagram with 128 points. According to the ADSL technical specifications, a 2-D constellation diagram can be divided into four quadrants, with an equivalent number of constellation points in each quadrant. Furthermore, each constellation point is a member one of four cosets. Constellation diagrams and cosets are considered well understood by those of ordinary skill in the art of the present invention. For a detailed explanation of the cosets, please refer to the ADSL technical specifications.

Figure 2:
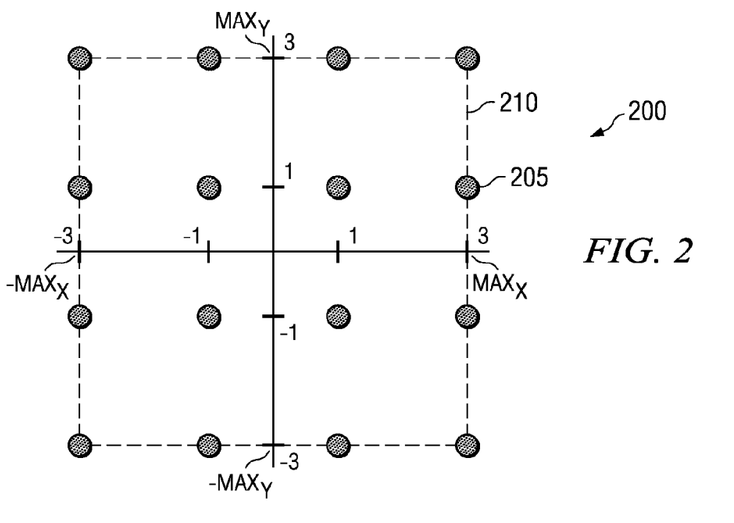
FIG. 2 is a diagram of a constellation for a tone with an even number of bits.

With reference now to FIG. 2, there is shown a diagram illustrating a constellation diagram 200 for a tone with an even number of bits, wherein the number of bits is four (4). FIG. 2 displays a constellation diagram for a tone where the tone has four bits of data. Note that constellation diagrams for tone with an even number of bits are similar to FIG. 2, with exception to the total number of constellation points. The constellation diagram 200 for a tone with four bits of data consists of sixteen (16) constellation points, such as constellation point 205. Each quadrant of the constellation diagram 200 can contain four (4) constellation points (16/4), which can be arranged in a regular square fashion.

Arranging the sixteen constellation points in a regular square fashion, the constellation diagram 200 can have a maximum X-axis value ($MAX_X$) and a maximum Y-axis value ($MAX_Y$). Since the constellation diagram is square, $MAX_X$ and $MAX_Y$ can be equal (in this case, $MAX_X=MAX_X=3$). A boundary 210 can be drawn around the constellation diagram to enclose points that lie inside the constellation diagram.

Figure 3:
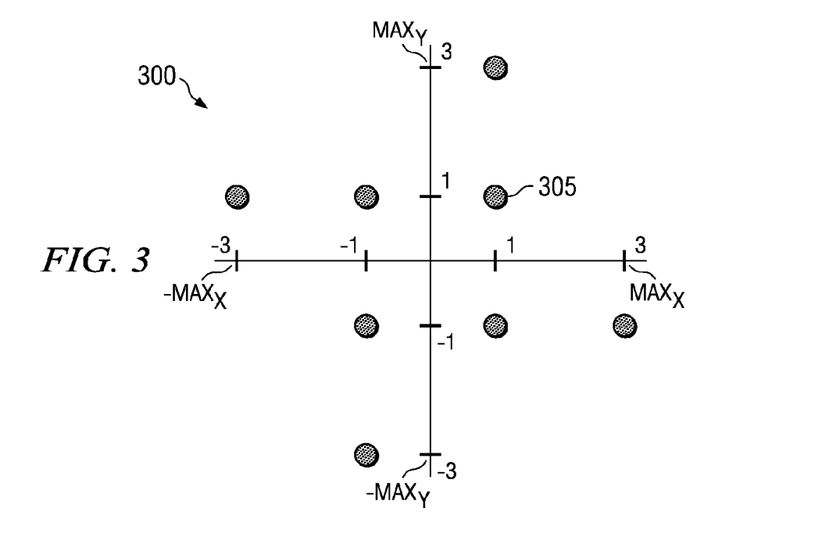
FIG. 3 is a diagram of a constellation for a tone with three bits.

With reference now to FIG. 3, there is shown a diagram illustrating a constellation diagram 300 for a tone with an odd number of bits, wherein the number of bits is three (3). With three bits, the constellation diagram 300 can have a total of eight (8) constellation points, such as constellation point 305. With eight constellation points, each quadrant can have two (2) constellation points (8/4). Therefore, it is not possible to create a square arrangement of constellation points within a single quadrant.

Figure 4:
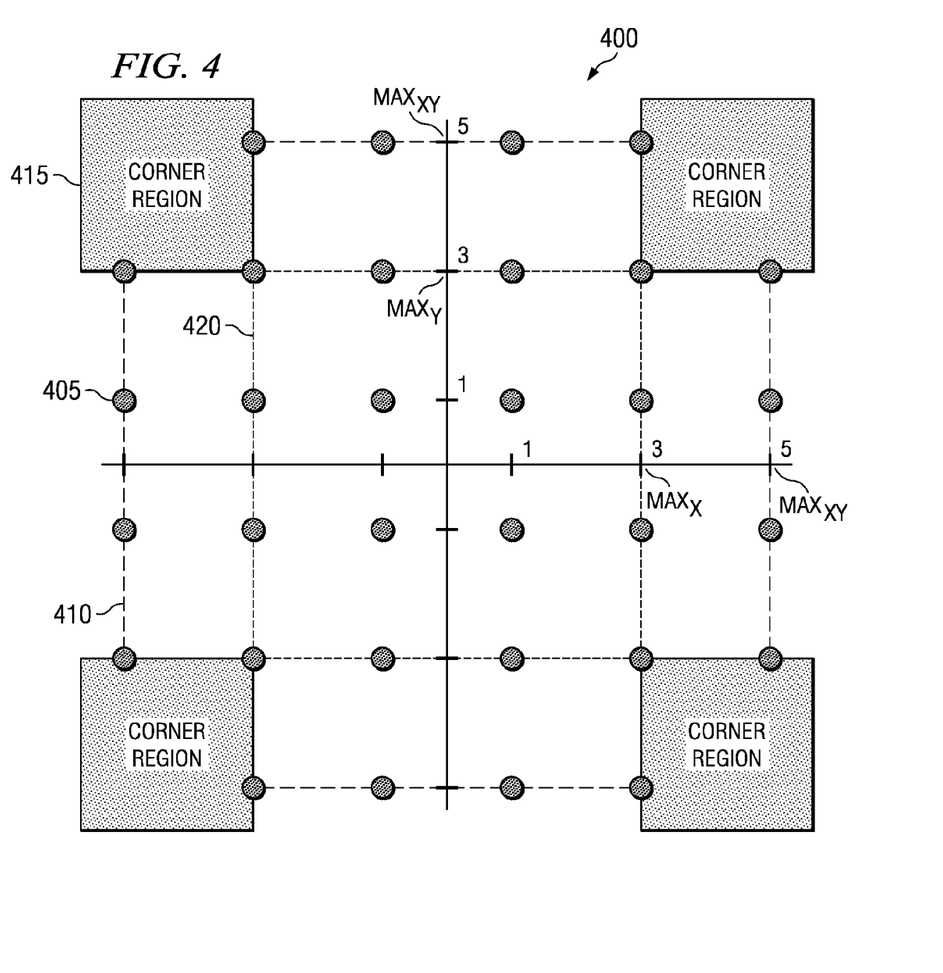
FIG. 4 is a diagram of a constellation for a tone with an odd number of bits.

With reference now to FIG. 4, there is shown a diagram illustrating a constellation diagram 400 for a tone with an odd number of bits, wherein the number of bits is five (5). With five bits, the constellation diagram 400 can have a total of 32 constellation points, such as constellation point 405. With a total of 32 constellation points, each quadrant can have eight (8) constellation points (32/4). Once again, it is not possible to create a square arrangement of constellation points within a single quadrant. With the number of bits being odd (and not equal to three (3)), it is possible to create a square arrangement of constellation points (region enclosed by boundary 410) in each quadrant with a corner region in each quadrant (such as corner region 415) removed. Within the area encompassed by the boundary 410 and the corner regions (such as corner region 415) can be a regular square arrangement of constellation points (encompassed by boundary 420). The area encompassed by the boundary 420 can be similar to a constellation diagram of a tone with an even number of bits, wherein the even number of bits is smaller than the odd number of bits associated with the tone shown in constellation diagram 400. For example, with the number of bits equal to five, the constellation diagram 400 can encompass a constellation diagram for a tone with a number of bits equal to four (the portion of the constellation diagram 400 encompassed by boundary 420).

The constellation diagram 400 can be described by several parameters. Two parameters $MAX_X$ and $MAX_Y$ can be used to describe the portion of the constellation diagram 400 containing the constellation points for a tone with the even number of bits (for example, the constellation points within the boundary 420). A third parameter that can be used to describe the constellation diagram 400 is $MAX_{XY}$, which can represent maximum extension along either the X- or the Y-axis for the constellation diagram 400. Note that since the constellation diagram 400 is square (with the exception of the missing corner regions) the maximum extension along the X-axis is equal to the maximum extension along the Y-axis.

Figure 5:
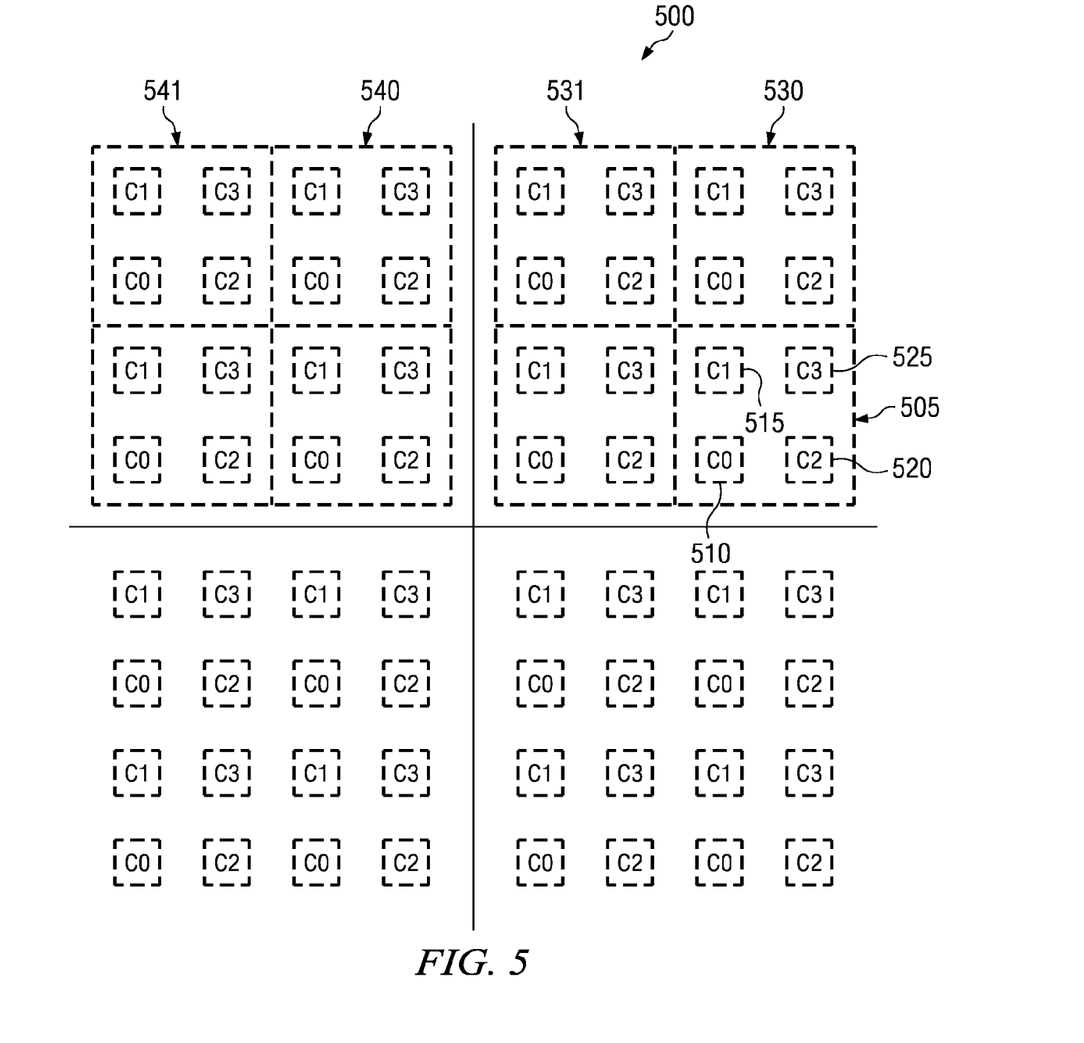
FIG. 5 is a diagram of a constellation wherein the constellation points are labeled according to the coset assignments.

With reference now to FIG. 5, there is a diagram illustrating a constellation diagram 500 wherein the constellation points are labeled according to their coset assignment. According to the ADSL technical standards, each constellation point in a constellation diagram can be grouped into one of four cosets (or constellation subsets). The cosets are regularly defined and a single group of four adjacent constellation points 505 (arranged in a square pattern) can be a building block for larger constellation diagram. Each of the four adjacent constellation points 505 belongs to a different coset. For example, constellation point 510 may belong to coset #0, while constellation point 515 may belong to coset #1, and constellation points 520 and 525 belong to cosets #3 and #4, respectively. The four adjacent constellation points 505 can be replicated to form a larger constellation diagram, for example, replicated four adjacent constellation points 530, 531, 540, and 541. Note that if the number of bits is odd, e.g., there will be corner regions in the constellation diagram, then there may be constellation points missing in four adjacent constellation point groupings that happen to lie at the corners, such as the replicated four adjacent constellation points 530 and 541 or entire four adjacent constellation points may be missing. The number of constellation points missing can be dependent upon the number of bits in the tone.

Figure 6:
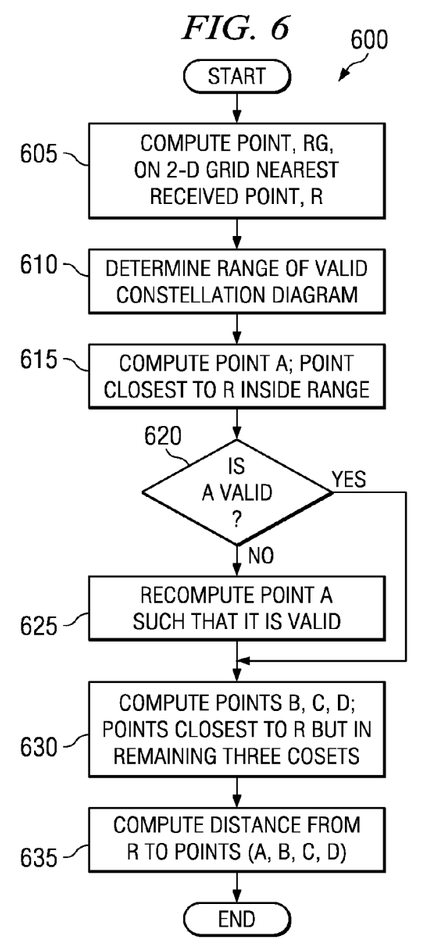
FIG. 6 is a diagram of an algorithm that can be used to locate closest coset points, according to a preferred embodiment of the present invention.

With reference now to FIG. 6, there is shown a diagram illustrating an algorithm 600 that can be used to locate closest cosets and closest constellation points for a received point, according to a preferred embodiment of the present invention. According to a preferred embodiment of the present invention, the algorithm 600 may execute in a constellation decoder (for example, the constellation decoder 125 (FIG. 1)), a trellis decoder (for example, the trellis decoder 130 (FIG. 1)), or on a processing element or central processor (neither shown) of a receiver (not shown). Note that the algorithm 600 may be used for tones representing any number of bits greater than three. After the receiver receives a received point, R, it can compute a point, RG, which can be a closest point to the received point, R, on a 2-D grid (block 605). Note that the 2-D grid can be an infinite sized grid overlaying an actual constellation diagram and therefore may contain points that are not a part of the constellation diagram.

The receiver can then determine the range of the constellation diagram (block 610). The range can include the extent of the constellation diagram along the two axes of the grid, the X-axis and the Y-axis. Also included, may be a value that is the larger of the two extents along the axes. After determining the range of the constellation diagram, the receiver can then compute a point, A, which can be a point actually within the range of the constellation diagram that is closest to the received point, R (block 615). However, in certain situations (a constellation diagram with an odd number of bits, for example) a point A may be within the range of the constellation diagram but still not be a valid constellation point. This may be due to the presence of corner regions in a constellation diagram for an odd number of bits (see FIG. 4 for a more detailed explanation).

Therefore, the receiver can check to see if the point A is a valid constellation point (block 620) and if it is not, the receiver may have to recompute a new point A such that it is a valid constellation point (block 625). With a valid point A, the receiver has a point belonging to one of the four cosets. The receiver can now compute three additional points (B, C, and D), one for each of the remaining three cosets (block 630) and then finish by computing the Euclidean distance from the received point, R, to the four computed points (block 635).

Figure 7A:
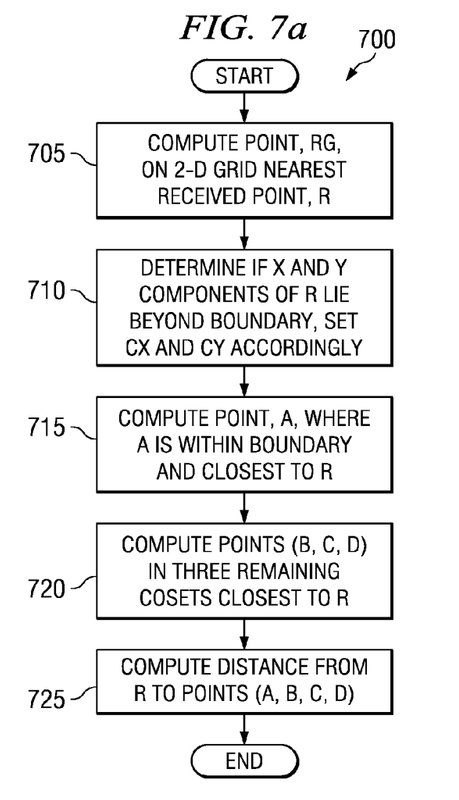
FIGS. 7a and 7b are diagrams of an algorithm for use in locating closest coset points for a tone with an even number of bits and an exemplary decoding of a received point.

With reference now to FIG. 7a, there is shown a diagram illustrating an algorithm 700 that can be used to locate closest cosets and closest constellation points for a received point wherein the tone represents an even number of bits, according to a preferred embodiment of the present invention. The algorithm 700 describes the decoding in greater detail than the algorithm 600 (FIG. 6) described above. The decoding can begin after the receiver has received a received point, R. After receiving the received point, R, the decoding can compute a point, RG, which can be a constellation point in a 2-D grid that is nearest to the received point, R (block 705). Given that the 2-D coordinates of the received point, R, can be (Rx, Ry), then the computed point, RG, can be found using an equation:

$$RG=(Rgx, Rgy)=\text{round}((Rx+iRy-1-i)/2)*2+1+i,$$

wherein RGx and RGy are the 2-D coordinates of the computed point, RG.

After computing the computed point, RG, the decoding can continue by determining if the 2-D coordinates of the received point, R, lie on (or beyond) the boundary of a constellation diagram based upon the number of bits (block 710). A constellation diagram that is based upon the number of bits, when the number of bits is even, is square with equal values for maximum X ($MAX_X$) and maximum Y ($MAX_Y$). Therefore, $MAX_{XY}$ (the larger of $MAX_X$ or $MAX_Y$) is equal to $MAX_X$ and $MAX_Y$. The value of $MAX_X$ and $MAX_Y$ can be readily computed with the expression: $MAX_X = MAX_Y = MAX_{XY} = 2^{bits/2} - 1$. If the abs(Rx) is greater than or equal to $MAX_X$, then a value Cx can be set to −1, else Cx can be set to 1, where abs(.) is the absolute value operator. Similarly, if the abs(Ry) is greater than or equal to $MAX_Y$, then a value Cy can be set to −1, else Cy can be set to 1.

Then, a point A can be computed such that A is the closest point within the constellation diagram to the received point, R (block 715). The computation of the point A may be dependent upon the value of Cx and Cy. The 2-D coordinates of the point A can be computed using the expressions:

$Ax = \text{sign}(RGx) * MAX_{XY}$ if $Cx = -1$ $Ax = RGx$ otherwise;

$Ay = \text{sign}(RGy) * MAX_{XY}$ if $Cy = -1$ $Ay = RGy$ otherwise;

wherein sign(.) is the sign operator (negative or positive).

The point A is, by definition, a valid constellation point that belongs to one of the four cosets that lies closest to the received point, R. The decoding now must find valid constellation points belonging to each of the three remaining cosets that lie closest to the received point, R (block 720). To compute the three points (points B, C, and D), an intermediate value may be computed: d=(dx, dy)=R−A. Then, using d, the three points can be computed using the following expressions:

$B = A + Cx * \text{sign}(dx) * 2,$ $C = A + i * Cy * \text{sign}(dy) * 2,$ $D = A + 2(Cx * \text{sign}(dx) + i * Cy * \text{sign}(dy)).$ After computing the points (A, B, C, and D), the decoding can then determine which point belongs in which coset. Finally, the Euclidean distance from the received point, R, to each of the points (A, B, C, and D), can be computed (block 725). The Euclidean distances computed in block 725 can then be provided to the Viterbi algorithm.

Figure 7B:
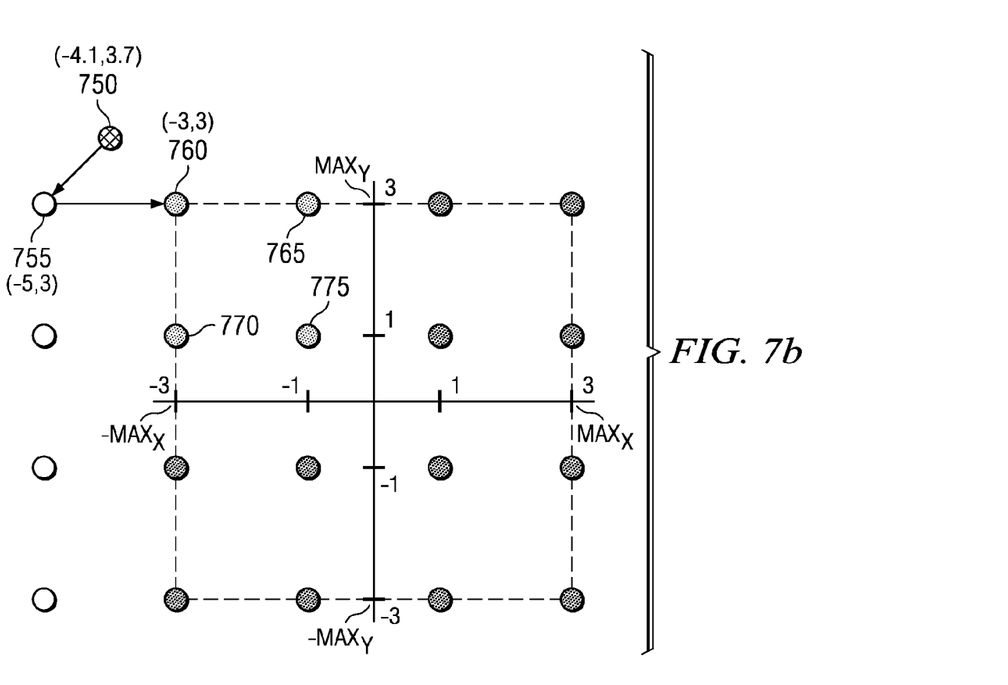

With reference now to FIG. 7b, there is shown a diagram illustrating an exemplary decoding of a received point, R 750, for a constellation diagram with the number of bits being equal to four, using the algorithm 700, according to a preferred embodiment of the present invention. For discussion purposes, let the received point, R 750 have coordinates (−4.1, 3.7). A computed point, RG 755, turns out to be located at (−5, 3) while $MAX_X = MAX_Y = MAX_{XY} = 3$. Since the received point, R 750, lies outside of the extent of the constellation diagram, Cx=−1 and Cy=−1. The point A 760 can be computed to be (−3, 3) and d=(−1.1, 0.7). This leads to points B 765 being (−1, 3), C 770 being (−3, 1), and D 775 being (−1, 1). The points (A 760, B 765, C 770, and D 775) belong to cosets (C (C #0), A (C #1), D (C #2), B (C #3)) respectively. Note that the coset that each of the points belongs to depends upon the coordinate values of the points and can vary depending upon the location of the received point, R. Finally, the Euclidean distances from points (A 760, B 765, C 770, and D 775) to the received point, R 750 are {8.5, 1.7, 16.9, 10.1}.

Figure 8A:
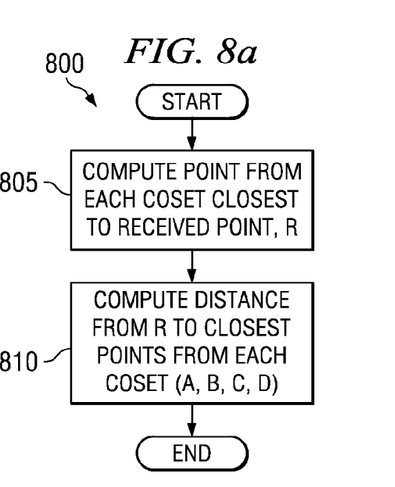
FIGS. 8a through 8c are diagrams of an algorithm for use to locate closest coset points for a tone with three bits and an exemplary decoding of a received point.

With reference now to FIG. 8a, there is shown a diagram illustrating an algorithm 800 that can be used to locate closest cosets and closest constellation points for a received point wherein the tone represents three (3) bits, according to a preferred embodiment of the present invention. In the case of the number of bits being equal to three, the number of constellation points is small (eight) and the algorithm 600 (FIG. 6) can be reduced to a relatively small number of operations. The decoding can begin after the receiver has received a received point, R. After receiving the received point, R, the decoding can compute points (A, B, C, and D), wherein each belongs to a different coset and each is the closest point of the respective coset to the received point, R (block 805). Note that the seemingly drastic reduction in the complexity of the computation may have been a result of the relatively simple structure of the constellation diagram when the number of bits is equal to three. A detailed explanation of the computations is provided below.

The computation of the points (A, B, C, and D) can also provide the coset to which each of the points (A, B, C, and D) belongs. Finally, the Euclidean distance from the received point, R, to each of the points (A, B, C, and D), can be computed (block 810). The Euclidean distances computed in block 810 can then be provided to the Viterbi algorithm.

Figure 8B:
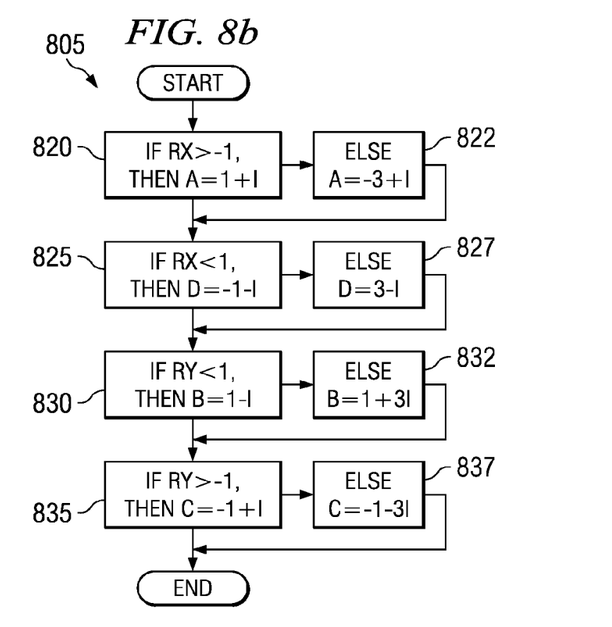

With reference now to FIG. 8b, there is shown a diagram illustrating the computations to compute points (A, B, C, and D) for a received point wherein the number of bits is equal to three, according to a preferred embodiment of the present invention. Since a constellation drawing for a tone representing three bits consists of eight constellation points, there are only two constellation points per quadrant. This small number of constellation points can lead to a simplification of the algorithm 600 (FIG. 6) and it may be possible to compute the points (A, B, C, and D) with the evaluation of a few relations. The computations displayed in FIG. 8b may be used in place of block 805 shown in FIG. 8a.

The computations displayed in FIG. 8b can compute a single constellation point for each coset that is closest to the received point, R, and is a valid constellation point. A first computation compares an X-axis value of the received point, R, Rx with a value of negative one (−1) (block 820). If Rx is greater than −1, then point A can be set to (1, 1) (block 820), else set point A to (−3, 1) (block 822). This computation can be the result of the fact that the only two points in coset #0 are (1, 1) and (−3, 1). Therefore, a mid-point between the two points can lie at (−1, 1). So, if a received point has an X-axis value that is greater than −1, then the received point will necessarily be closer to the (1, 1) point and vice versa. Similar logic may be used in the computation of the remaining three points. A second computation compares an X-axis value of the received point, R, Rx with a value of one (1) (block 825). If Rx is less than 1, then point D can be set to (−1, −1) (block 825), else set point D to (3, −1) (block 827). A third computation compares a Y-axis value of the received point, R, Ry with a value of one (1) (block 830). If Ry is less than 1, then point B can be set to (1, −1) (block 830), else set point B to (1, 3) (block 832). A fourth computation compares a Y-axis value of the received point, R, Ry with a value of negative one (−1) (block 835).

If Ry is greater than −1, then point C can be set to (−1, 1) (block 835), else set point D to (1, −3) (block 837).

Figure 8C:
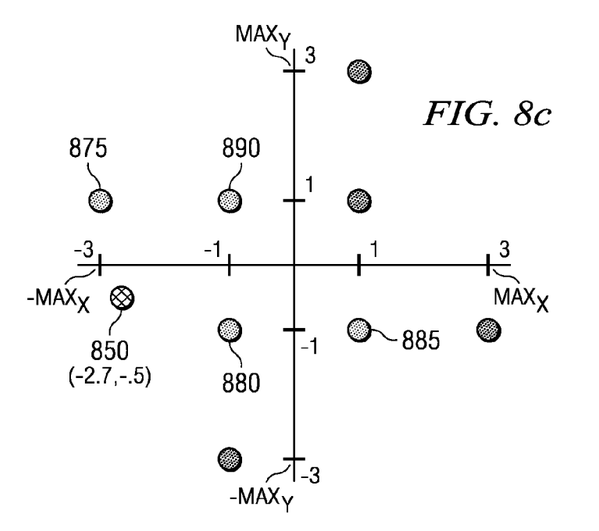

With reference now to FIG. 8c, there is shown a diagram illustrating an exemplary decoding of a received point, R 850, for a constellation diagram with the number of bits being equal to three, using the algorithm 800, according to a preferred embodiment of the present invention. For discussion purposes, let the received point 850 have coordinates (−2.5, −0.5). The first computation may compare Rx=−2.7 with −1. Since Rx<−1, then point A 875 can be set to (−3, 1). The second computation may compare Rx=−2.7 with 1. Since Rx<1, then point D 880 can be set to (−1, −1). The third computation may then compare Ry=−0.5 with 1. Since Ry<1, then point B 885 can be set to (1, −1). The fourth computation may then compare Ry=−0.5 with −1. Since Ry>−1, then point C 890 can be set to (−1, 1).

Referencing the constellation diagram, Point A 875 may belong to coset #0, Point B 885 may belong to coset #1, Point C 890 may belong to coset #2, and Point D 880 may belong to coset #3. The Euclidean distance from the received point, R 850, to each of the computed points may then be computed as {2.34, 13.94, 5.14, 3.14}.

Figure 9A:
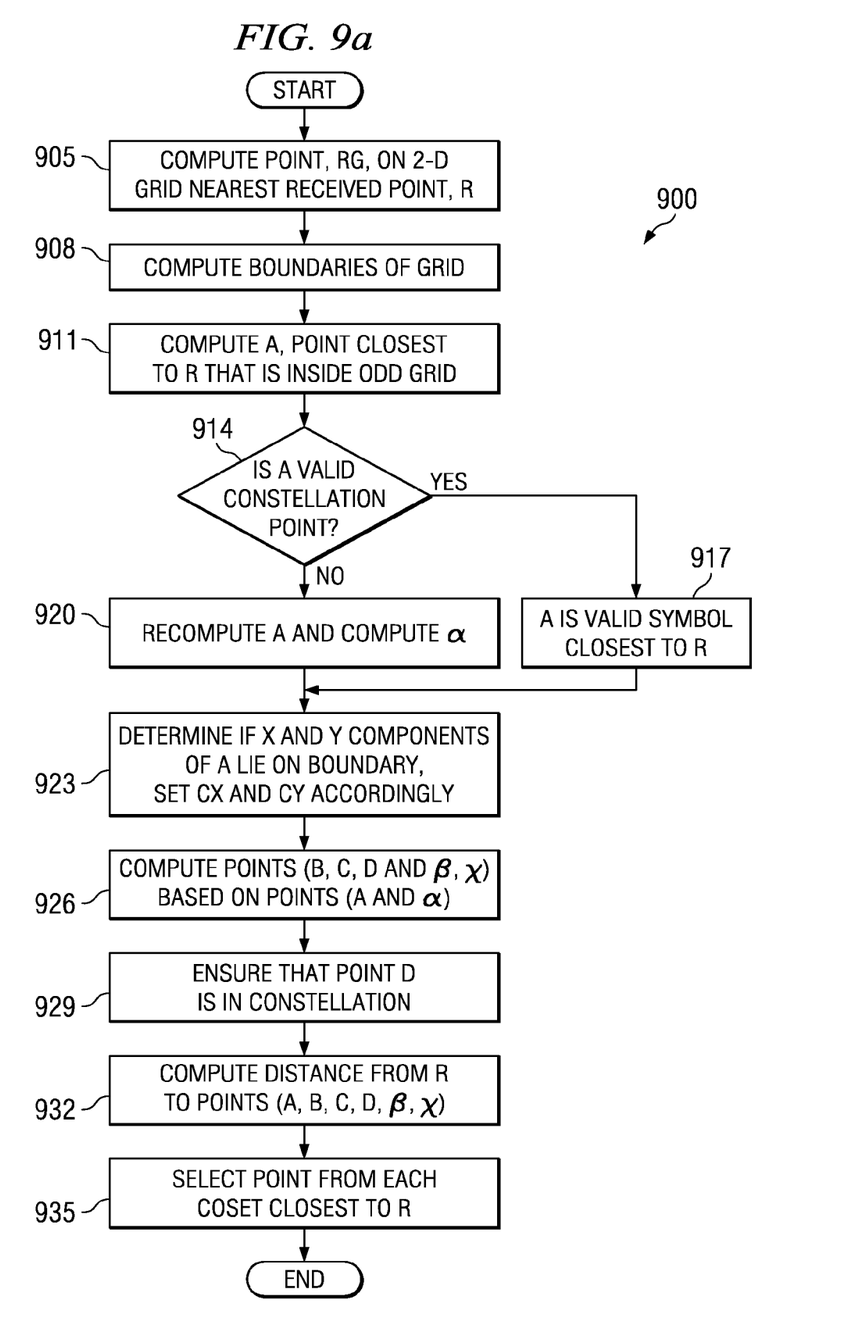
FIGS. 9a and 9b are diagrams of an algorithm for use to locate closest coset points for a tone with an odd number of bits and an exemplary decoding of a received point.

With reference now to FIG. 9a, there is shown a diagram illustrating an algorithm 900 that can be used to locate closest cosets and closest constellation points for a received point wherein the tone represents an odd number of bits (with exception of three (3)), according to a preferred embodiment of the present invention. The algorithm 900 describes the decoding in greater detail than the algorithm 600 (FIG. 6) described above. Note that the algorithm 800 (FIG. 8a) exploits the relatively simple structure of the constellation diagram when the number of bits is equal to three. The decoding can begin after the receiver has received a received point, R. After receiving the received point, R, the decoding can compute a point, RG, which can be a constellation point in a 2-D grid that is nearest to the received point, R (block 905). The point, RG, may have a set of 2-D coordinates (RGx, RGy) and can be found via an equation:

$RG=(RGx, RGy)=\text{round}((Rx+iRy-1-i)/2)*2+1+I.$

After computing the point, RG, the decoding can continue by computing a boundary of the constellation diagram, $MAX_{XY}$ (block 908). Since the constellation diagram may be square, the extent of the constellation along the X-axis is equal to the extent along the Y-axis. The boundary of the constellation diagram, $MAX_{XY}$ can be computed using the expression:

$MAX_{XY}=(2^{\lceil bits/2 \rceil}+2^{\lfloor bits/2 \rfloor})/2-1,$ wherein $\lfloor . \rfloor$ is the floor operator and $\lceil . \rceil$ is the ceiling operator.

However, the constellation diagram for a tone with an odd number of bits may not be a complete square in appearance. In each quadrant of the constellation diagram, there can be a corner region (for example, the corner region 415 (FIG. 4)) where there are no valid constellation points. A truly square constellation diagram may be fitted inside the constellation diagram. This truly square constellation diagram can have a maximum X-axis extent of $MAX_X$ and a maximum Y-axis extent of $MAX_Y$ with $MAX_X$ being equal to $MAX_Y$. The value of $MAX_X$ and $MAX_Y$ may be computed from an expression:

$MAX_X=MAX_Y=2^{\lfloor bits/2 \rfloor}-1.$

After computing the boundary of the constellation diagram, the decoding can continue by computing a point A, wherein the point A may be a point that may be inside the constellation diagram and may be closest to the received point R (block 911). The point A can be computed using the expression:

$Ax=\text{sign}(RGx)*MAX_{XY}$ if $abs(RGx)>MAX_{XY}$ $Ax=RGx$ otherwise;

$Ay=\text{sign}(RGy)*MAX_{XY}$ if $abs(RGy)>MAX_{XY}$ $Ay=RGy$ otherwise.

However, the computed point A may not be a valid constellation point since it may be located in a corner region. The decoding can check to determine if the point A is a valid constellation point (block 914) by evaluating the expression:

$[abs(Rx)>MAX_X]$ and $[abs(Ry)>MAX_Y].$

If the expression evaluates true, then the computed point A may not be a valid constellation point (block 917). If the computed point A is not a valid constellation point, the decoding can compute a new point A and a point α (block 920). The new point A can then be a valid symbol closest to the received point, R, and α is another symbol to be used at a later time. The new point A and the point α may be computed using expressions:

$$\left. \begin{array}{l} \alpha = \text{sign}(Ax)*MAX_X + i*Ay \\ A = Ax + i*\text{sign}(Ay)*MAX_Y \end{array} \right\} \text{ if } abs(Rx)>abs(Ry)$$

$$\left. \begin{array}{l} \alpha = Ax + i*\text{sign}(Ay)*MAX_Y \\ A = \text{sign}(Ax)*MAX_X + i*Ay \end{array} \right\} \text{ otherwise}$$

The decoding can then continue by determining if the X-axis and Y-axis components of point A (the original point A computed in block 911 or the new point A computed in block 920 depending upon the validity of the original point A) lie on the boundaries of the constellation diagram (block 923). Assign a value of −1 to Cx and/or Cy if the corresponding X- and Y-axis components of point A lie on the boundary of the constellation diagram and assign a value of 1 to Cx and/or Cy if the corresponding X- and Y-axis components do not lie on the boundary of the constellation diagram. Similarly, the decoding can determine if the X-axis and Y-axis components of point a lie on the boundaries of the constellation diagram. C'x=−1(C'y=−1) if the X-axis (Y-axis) component of a lies on the boundary of the constellation, else C'x=1 (C'y=1). Note that the X-axis component of point A lie on the boundary of the constellation diagram only if $(((abs(Rx)>=MAX_X)$ and $(abs(Ay)>MAX_Y))$ or $(abs(Rx)>=MAX_{XY}))$ evaluates to true.

The point A may belong to one of the four cosets, therefore, points for each of the remaining three cosets may need to be computed. The decoding can compute the remaining three points (B, C, and D) and several additional points (β and χ) (block 926) by using the points A and α (calculated in block 920). To compute the remaining points (B, C, D, β, and χ), several intermediate values may be computed: d=(dx, dy)=R−A and d'=(d'x, d'y)=R−α. The decoding can then compute the following points:

$B=A+Cx*\text{sign}(dx)*2;$ $β=a+C'x*\text{sign}(d'x)*2;$ $C=A+i*Cy*\text{sign}(dy)*2;$ $\chi=a+i*C'y*\text{sign}(d'y)*2;$ $D=A+2*(Cx*\text{sign}(dx)+i*Cy*\text{sign}(dy)).$ Due to properties of the constellation diagram, all points calculated above (blocks 920 and 926), except for point D, may be ensured to be valid points. Therefore, it can be needed to check that point D is a valid point (block 929). The decoding may check to see if point D lies within a corner region and if so, modify it appropriately. The point D can be checked using the following expression:

```
if (abs(REAL(D)) > MAX_X) and (abs(IMAG(D)) > MAX_Y))
{ if (abs(dx) > abs(dy)) then
    D = D - 4 * sign(IMAG(D)) * i;
  else
    D = D - 4 * sign(REAL(D)); }
```

After the point D has been adjusted (if required), the decoding can compute the Euclidean distance between the received point, R, and each of the points (A, B, C, D, α, β, and χ) (block 932). Since there are seven points, some of the cosets in the constellation may contain more than one point. Therefore, the decoding can select a point from each coset with the smallest Euclidean distance to provide to the Viterbi algorithm (block 935).

Note that it is possible to simplify the computations by not computing (and using) the points (α, β, and χ). For the majority of cases, not computing these points does not affect the performance of locating closest cosets and closest constellation points. Furthermore, in the cases where the lack of these points does have an effect on the performance, the performance impact may be sufficiently small and can be ignored. Note however, that in these cases, by not using the points (α, β, and χ), the optimal answer can no longer be ensured.

Figure 9B:
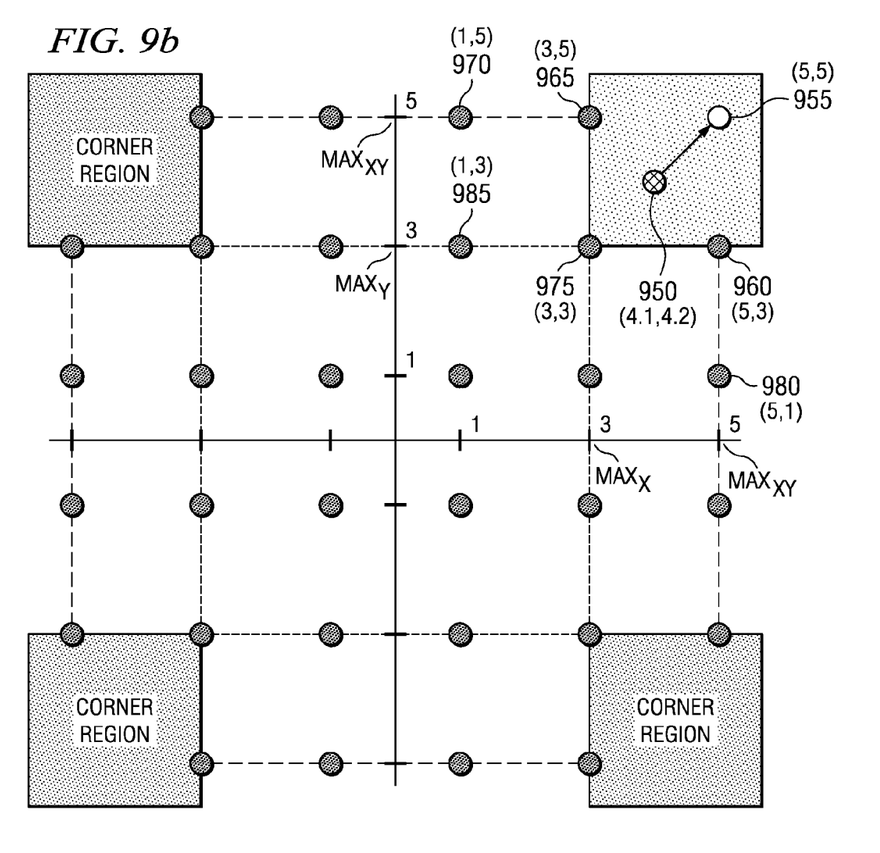

With reference now to FIG. 9b, there is shown a diagram illustrating an exemplary decoding of a received point, R 950, for a constellation diagram with the number of bits being equal to five, using the algorithm 900, according to a preferred embodiment of the present invention. For discussion purposes, let the received point, R 950 have coordinates (4.1, 4.2). A computed point, RG 955, turns out to be located at (5, 5) while $MAX_{XY}=5$, $MAX_X=3$, and $MAX_Y=3$. The computed point A is initially computed to be at (5, 5), however, since this is in a corner region (abs(Rx)<abs(Ry), a new point A along with point α is computed. The new point A 965 is at (3, 5) while point α 960 is at (5, 3).

Values Cx, Cy, C'x, and C'y are determined to be: Cx=−1, Cy=1, C'x=1, and C'y =−1. Intermediate value d is (1.1, −0.8) and d' is (−0.9, 1.2). Using points A and α, the remaining points are determined to be: B 970 located at (1, 5), β 975 located at (3, 3), C 975 located at (3, 3), χ 980 located at (5, 1), and D 985 located at (1, 3). Then, based on their coordinates, the points (A, B, C, D, α, β, χ) are located at cosets (C#2, C#0, C#3, C#1, C#1, C#3, C#0) respectively and are (1.85, 10.25, 2.65, 11.05, 2.25, 2.65, 11.05) from the received point, R 950. Since cosets #0, #1, and #3 each have two points, the point with the smaller distance may be selected. The following Euclidean distances can be provided to the Viterbi algorithm (1.85, 10.25, 2.65, 2.25).

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for computing distances between a received point for a tone received in a receiver and four points in a two-dimensional grid with a constellation representing a number of bits greater than three, the method comprising:
   determining a first point on a grid nearest to the received point;
   computing a second point closest to the received point inside a specified area after determining the first point;
   computing a third, a fourth, and a fifth point, after computing the second point, wherein each of the second, the third, the fourth and the fifth points is a member of a different coset in the constellation and is the closest point in its coset to the received point; and
   computing distances from the received point to each of the second, the third, the fourth, and the fifth points; and
   providing the computed distances to a decoder.

2. The method of claim 1 further comprising, after the computing the second point, recomputing the second point if the second point is invalid.

3. The method of claim 2, wherein the second point is invalid if it is outside of the constellation.

4. The method of claim 1, wherein the first point can be determined by evaluating:

$\text{round}((Rx+iRy-1-i)/2)*2+1+I,$ wherein Rx and Ry are two-dimensional components of the received point, I is an imaginary number, and round(.) is an operator that returns an integer number closest to a value provided to it.

5. The method of claim 1, wherein the number of bits is an even value, wherein the received point can be expressed in two-dimensional components Rx and Ry, and wherein the computing the second point comprises:
   determining if Rx and Ry lie inside a square specified by the number of bits; and
   computing two-dimensional components of the second point based on whether Rx and Ry lie inside the square.

6. The method of claim 5, wherein the computing the second point further comprises:
   setting Cx=1 if Rx lies inside a boundary of the square, else Cx=−1;
   setting Cy=1 if Ry lies inside the boundary of the square, else Cy=−1;
   setting Ax=sign(RGx)*$MAX_{xy}$ if Cx=−1, else Ax=RGx; and
   setting Ay=sign(RGy)*$MAX_{xy}$ if Cy=−1, else Ay=RGy,
   wherein Ax and Ay are two-dimensional components of the second point, RGx and RGy are two-dimensional components of the first point, and $MAX_{xy}$ is a value describing a size of the square and can be computed by $2^{number\ of\ bits/2}-1$.

7. The method of claim 5, wherein the computing the third, the fourth and the fifth points comprises:
   computing an intermediate value, d, wherein d=the received point−the second point;
   setting the third point=the second point+Cx*sign(dx)*2;
   setting the fourth point=the second point+i*Cy*sign(dy)*2; and
   setting the fifth point=the second point+2(Cx*sign(dx)+i*Cy*sign(dy)),
   wherein Cx and Cy are values specifying if the two-dimensional components of the received point lie inside a boundary of the square and dx and dy are two-dimensional components of d.

8. The method of claim 5, wherein the computing the distances comprises computing a Euclidean distance from the received point to each of the second, the third, the fourth, and the fifth points.

9. The method of claim 1, further comprising decoding the received point in a communications system.

10. The method of claim 9, wherein the communications system is an asymmetric digital subscriber line (ADSL) compliant system.

11. A method for computing distances between a received point for a tone received in a receiver and a plurality of coset points in a two-dimensional grid with a constellation representing a number of bits greater than three, the method comprising:
   determining a received grid point on a grid nearest to the received point;
   determining whether the received grid point is valid;
   determining an alternate grid point inside a specified area if the received grid point is determined to be not valid;
   assigning the received grid point to a first coset point of the plurality of coset points if the received grid point is valid;
   assigning the alternate grid point to the first coset point of the plurality of coset points if the received grid point is not valid;
   computing remaining coset points of the plurality of coset points within the specified area, wherein each coset point is a member of a unique coset and is the closest point in its coset to the received point;
   computing distances from the received point to each coset point of the plurality of coset points; and
   providing the computed distances to a decoder.

12. The method of claim 11, wherein the determining whether the received grid point is valid comprises determining whether the received grid point is within the constellation.

13. The method of claim 11, wherein the received grid point is determined by evaluating:

round(($Rx+iRy-1-i$)/2)*2+1+$I$, wherein Rx and Ry are two-dimensional components of the received point, I is an imaginary number, and round(.) is an operator that returns an integer number closest to a value provided to it.

14. The method of claim 11, wherein the number of bits is an even value, wherein the received point can be expressed in two-dimensional components Rx and Ry, and wherein the determining whether the received grid point is valid comprises determining if Rx and Ry lie inside a square specified by the number of bits.

15. The method of claim 14, further comprising computing two-dimensional components of the first coset point of the plurality of coset points based on whether the received grid point is valid, wherein, if the received grid point is valid, the received grid point is computed and, if the received grid point is not valid, the alternate grid point is computed.

16. The method of claim 15, wherein determining if Rx and Ry lie inside the square comprises:
   setting Cx=1 if Rx lies inside a boundary of the square, else Cx=−1; and
   setting Cy=1 if Ry lies inside the boundary of the square, else Cy=−1,
   wherein computing the two-dimensional components comprises
   setting Ax=sign(RGx)*$MAX_{xy}$ if Cx=−1, else Ax=RGx, and
   setting Ay=sign(RGy)*$MAX_{xy}$ if Cy=−1, else Ay=RGy,
   wherein Ax and Ay are the two-dimensional components of the first coset point of the plurality of coset points, RGx and RGy are two-dimensional components of the received grid point if the received grid point is valid or of the alternate grid point if the received grid point is not valid, and $MAX_{xy}$ is a value describing a size of the square and can be computed by $2^{number\ of\ bits/2}-1$.

17. The method of claim 15, wherein computing the remaining coset points comprises:
   computing an intermediate value, d, wherein d=the received point−the first coset point of the plurality of coset points; and
   setting the second coset point of the plurality of coset points=the first coset point of the plurality of coset points+Cx*sign(dx)*2,
   wherein Cx and Cy are values specifying if the two-dimensional components Rx and Ry of the received point lie inside a boundary of the square and dx and dy are two-dimensional components of d.

18. The method of claim 17, wherein the computing the remaining coset points further comprises setting the third coset point of the plurality of coset points equal to the first coset point of the plurality of coset points+i*Cy*sign(dy)*2.

19. The method of claim 18, wherein the computing the remaining coset points further comprises setting the fourth coset point of the plurality of coset points equal to the first coset point of the plurality of coset points+2(Cx*sign(dx)+i*Cy*sign(dy)).

20. The method of claim 15, wherein the computing the distances from the received point to each coset point of the plurality of coset points comprises computing a Euclidean distance from the received point to each coset point of the plurality of coset points.

21. The method of claim 11, further comprising decoding the received point in a communications system.

22. The method of claim 21, wherein the communications system is an asymmetric digital subscriber line (ADSL) compliant system.

* * * * *